United States Patent
Cai et al.

(10) Patent No.: US 11,038,572 B2
(45) Date of Patent: Jun. 15, 2021

(54) METHOD AND APPARATUS FOR REDUCING PAR OF BEAMFORMING OUTPUT SIGNALS

(71) Applicant: Nokia Shanghai Bell Co., Ltd., Shanghai (CN)

(72) Inventors: Zhenhao Cai, Shanghai (CN); Lei Wang, Shanghai (CN); Kun Zhao, Shanghai (CN); Yong Song, Shanghai (CN)

(73) Assignee: Nokia Shanghai Bell Co., Ltd., Shanghai (CN)

( * ) Notice: Subject to any disclaimer, the term of this patent is extended or adjusted under 35 U.S.C. 154(b) by 0 days.

(21) Appl. No.: 16/757,131

(22) PCT Filed: Nov. 17, 2017

(86) PCT No.: PCT/CN2017/111710
§ 371 (c)(1),
(2) Date: Apr. 17, 2020

(87) PCT Pub. No.: WO2019/095305
PCT Pub. Date: May 23, 2019

(65) Prior Publication Data
US 2020/0343949 A1    Oct. 29, 2020

(51) Int. Cl.
*H04B 7/06* (2006.01)

(52) U.S. Cl.
CPC .................. *H04B 7/0617* (2013.01)

(58) Field of Classification Search
CPC .. H04B 7/0617; H04B 7/0452; H04B 7/0456; H04B 7/0639; H04L 27/2614
See application file for complete search history.

(56) References Cited

U.S. PATENT DOCUMENTS

| 10,756,939 B1 * | 8/2020 | Bruzzone ........... H04L 25/03993 |
| 2007/0064641 A1 * | 3/2007 | Laroia .................. H04B 7/0617 370/320 |

(Continued)

FOREIGN PATENT DOCUMENTS

CN    106789822 A    5/2017

OTHER PUBLICATIONS

Hang Ruan et al. "Robust Adaptive Beamforming Algorithms Based on Low-Rank and Cross-Correlation Techniques", IEEE Transactions on Signal Processing, vol. 64. No. 15, Aug. 1, 2016 (Aug. 1, 2016), pp. 3919-3932.

(Continued)

*Primary Examiner* — Sung S Ahn
(74) *Attorney, Agent, or Firm* — Harness, Dickey & Pierce, P.L.C.

(57) ABSTRACT

The objective of the present invention is to provide a method and apparatus for reducing PAR of beamforming output signals. A method for reducing PAR of beamforming output signals, wherein input base band data is for N ports and number of beamforming output pipes is M; wherein the method comprises the following steps: building a correlation matrix of the input base band data of the N ports; determining adjusting weight vector for the input data of each port in time domain based on the correlation matrix and $w_k$ being the beamforming weight vector of the total N beams for the k-th output pipe, to minimize the correlation of the input base band data of the N ports; adjusting the phase of the input data of each port in time domain based on the adjusting weight vector before beamforming. The present invention enables a reduction on PAR of the beamforming output signals and then improves LTE and 5G power control performance.

8 Claims, 5 Drawing Sheets

(56) References Cited

U.S. PATENT DOCUMENTS

2009/0195453 A1 8/2009 Kim
2015/0381259 A1 12/2015 Bromberg et al.

OTHER PUBLICATIONS

International Search Report PCT/ISA/210 for International Application No. PCT/CN2017/111710 dated Aug. 21, 2018.

* cited by examiner

METHOD AND APPARATUS FOR REDUCING PAR OF BEAMFORMING OUTPUT SIGNALS

CROSS-REFERENCE TO RELATED APPLICATIONS

This application is a national phase under 35 U.S.C. § 371 of PCT International Application No. PCT/CN2017/111710 which has an International filing date of Nov. 17, 2017, the entire contents of each of which are hereby incorporated by reference.

TECHNICAL FIELD

The present invention relates to the technology of 5G communication, especially to reducing PAR of beamforming output signals.

BACKGROUND OF INVENTION

The beamforming technology is a significant strategy to get the beamforming gain, which has been widely used in the Massive-MIMO systems. But beamforming can also worsen the Peak to Average power Ration(PAR) of the beamforming module output pipes' signals, and the 1st pipe's PAR is the highest one because its weight vector $w_1 = [1\ 1\ 1\ 1]^T$ is full of 1.

In LTE-A/5G system, the PAR of the beamforming module output pipes can be very high, especially in the multi-layer space division multiplex scenarios.

For example, in a 16-layer case, the PAR of two output pipes is 18.09 dB below after digital beamforming, while the PAR theoretical expected value is 9.64 dB. Herein, the PAR in the 1st output pipe turns out to be much higher. These beamforming output signals are then processed in the RF (Radio Frequency) module containing a CFR (Crest Factor Reduction) function to "cut" the peak power points before these signals to be transmitted.

Figure 1A:
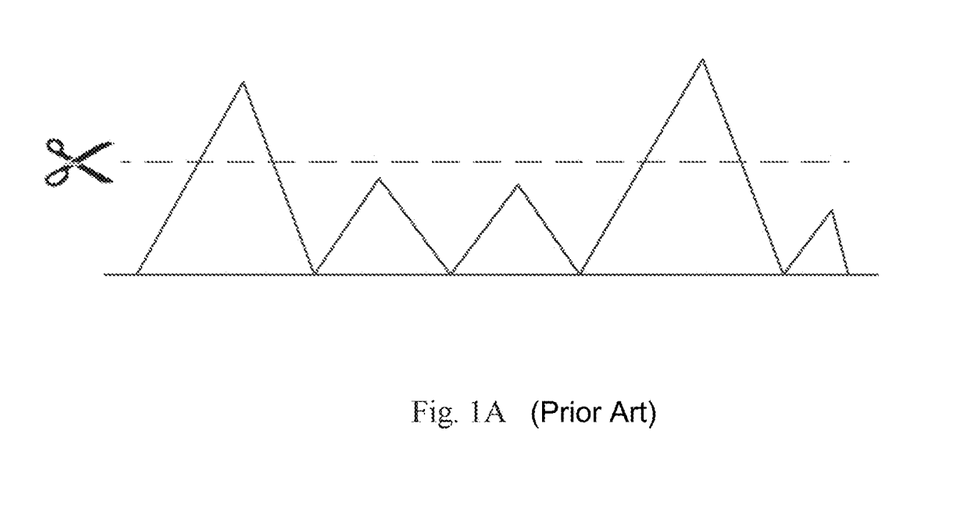
FIG. 1A shows an exemplary schematic of a signal wave before CFR.
Figure 1B:
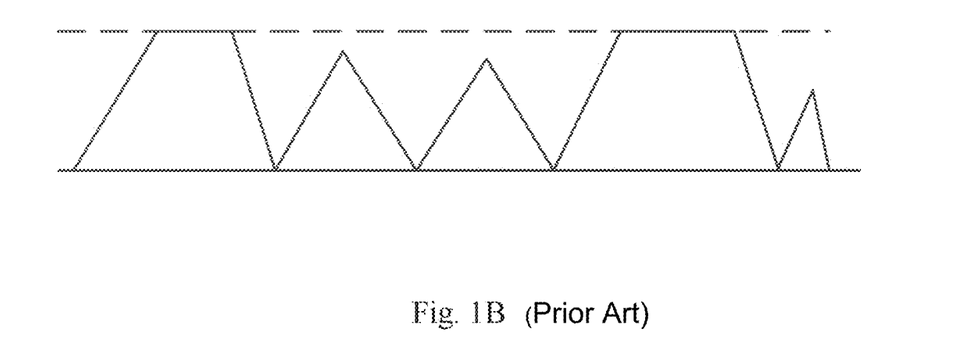
FIG. 1B shows an exemplary schematic of a signal wave after CFR.

The CFR function is illustrated in FIGS. 1A and 1B. Referring to FIG. 1A, CFR function cuts the power points beyond a defined threshold. Then the output signal gets distorted as shown in FIG. 1B.

High PAR will bring high distortion to the signals in the beamforming output pipes and worsen the BLER (Block Error Rate), which is not allowed in LTE-A/5G system. Hence, the high PAR is a common problem for LTE-A/5G system, which is brought by multi-layer beamforming use case.

The CFR function in RF module can reduce the PAR by directly getting rid of the peak points, but it will make the signals distorted and worsen the BLER at the receiver side. Thus CFR is not a good solution to deal with the high PAR problem.

SUMMARY OF INVENTION

The objective of the present invention is to provide a method and apparatus for reducing PAR of beamforming output signals.

According to one aspect of the present invention, a method for reducing PAR of beamforming output signals, wherein input base band data is for N ports and number of beamforming output pipes is M;
wherein the method comprises the following steps:
building a correlation matrix of the input base band data of the N ports;
determining adjusting weight vector for the input data of each port in time domain based on the correlation matrix and $w_k$ being the beamforming weight vector of the total N beams for the k-th output pipe, to minimize the correlation of the input base band data of the N ports, wherein $w_k = \{w_{1,k} w_{2,k} w_{3,k} \ldots w_{N,k}\}$, k=1, 2, ..., M;
adjusting the phase of the input data of each port in time domain based on the adjusting weight vector before beamforming.

According to one aspect of the present invention, an apparatus for reducing PAR of beamforming output signals, wherein input base band data is for N ports and number of beamforming output pipes is M;
wherein the apparatus is configured to:
build a correlation matrix of the input base band data of the N ports;
determine adjusting weight vector for the input data of each port in time domain based on the correlation matrix and $w_k$ being the beamforming weight vector of the total N beams for the k-th output pipe, to minimize the correlation of the input base band data of the N ports, wherein $w_k = \{w_{1,k} w_{2,k} w_{3,k} \ldots w_{N,k}\}$, k=1, 2, ..., M;
adjust the phase of the input data of each port in time domain based on the adjusting weight vector before beamforming.

According to one aspect of the present invention, an apparatus for reducing PAR of beamforming output signals, wherein input base band data is for N ports and number of beamforming output pipes is M;
wherein the apparatus comprises:
means for building a correlation matrix of the input base band data of the N ports and determining adjusting weight vector for the input data of each port in time domain based on the correlation matrix and $w_k$ being the beamforming weight vector of the total N beams for the k-th output pipe, to minimize the correlation of the input base band data of the N ports, wherein $w_k = \{w_{1,k} w_{2,k} w_{3,k} \ldots w_{N,k}\}$, k=1, 2, ..., M;
means for adjusting the phase of the input data of each port in time domain based on the adjusting weight vector before beamforming.

According to one aspect of the present invention, an eNode B for reducing PAR of beamforming output signals, wherein input base band data is for N ports and number of beamforming output pipes is M;
wherein the apparatus is configured to:
build a correlation matrix of the input base band data of the N ports;
determine adjusting weight vector for the input data of each port in time domain based on the correlation matrix and $w_k$ being the beamforming weight vector of the total N beams for the k-th output pipe, to minimize the correlation of the input base band data of the N ports, wherein $w_k = \{w_{1,k} w_{2,k} w_{3,k} \ldots w_{N,k}\}$, k=1, 2, ..., M;
adjust the phase of the input data of each port in time domain based on the adjusting weight vector before beamforming.

The present invention enables a reduction on PAR of the beamforming output signals and then improves LTE and 5G power control performance.

DESCRIPTION OF ACCOMPANIED DRAWINGS

Through reading the following detailed depiction on the non-limiting embodiments with reference to the accompanying drawings, the other features, objectives, and advantages of the present invention will become clearer.

Same or like reference numerals in the accompanying drawings indicate the same or corresponding components.

EMBODIMENT OF INVENTION

Hereinafter, the present invention will be further described in detail with reference to the accompanying drawings.

The present invention provides a solution of PAR reduction to minimize the PAR by introducing an optimal initial phase vector without signal wave distortion in time domain.

Specifically, weight vector θ for adjusting the phases of input base band data of each port is introduced to minimize the correlation of the input data of the N ports before beamforming.

Figure 2:
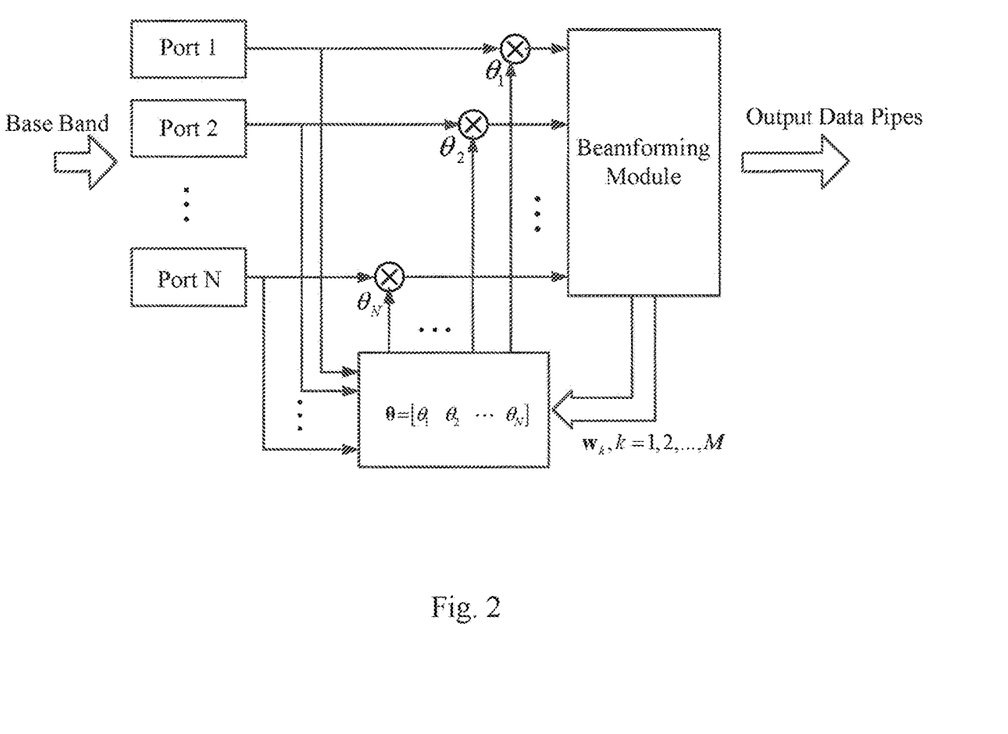
FIG. 2 shows an exemplary schematic of PAR reduction according to the present invention.

Referring to FIG. 2, the number of input ports of base band signals is N, the number of output pipes of the beamforming module is M.

And the original input data for each port can be defined as data vector s, the adjusting weight vector θ can be defined as $\theta=[\theta_1\ \theta_2\ \ldots\ \theta_N]$.

Figure 3:
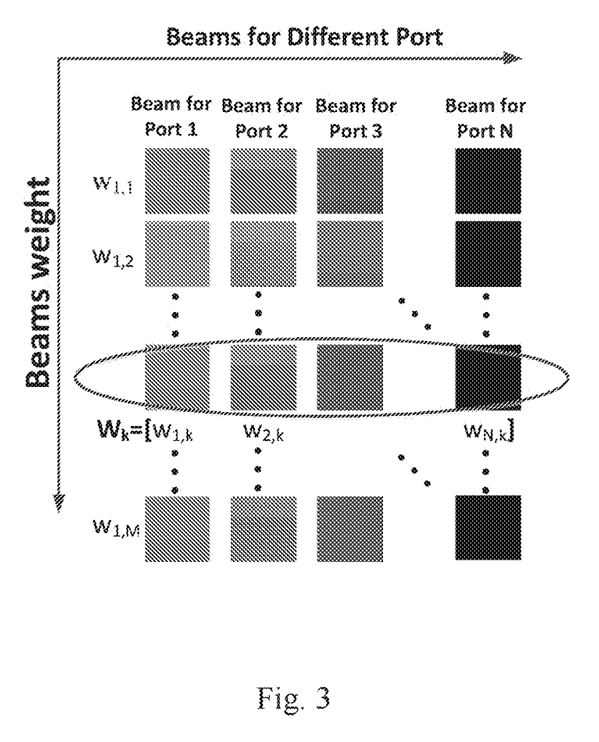
FIG. 3 shows an exemplary schematic of $w_k$ according to the present invention.

Beamforming weight vector $w_k$ is the weight vector of the total N beams for the k-th output pipe. And $w_k=\{w_{1,k}\ w_{2,k}\ w_{3,k}\ \ldots\ w_{N,k}\}$, k=1, 2, ..., M. FIG. 3 shows an exemplary schematic of $w_k$.

It should be noted that $w_k$ can be set by the user depending on the design of PAR reduction, or can be predefined according to relevant 3GPP Specifications.

Figure 4:
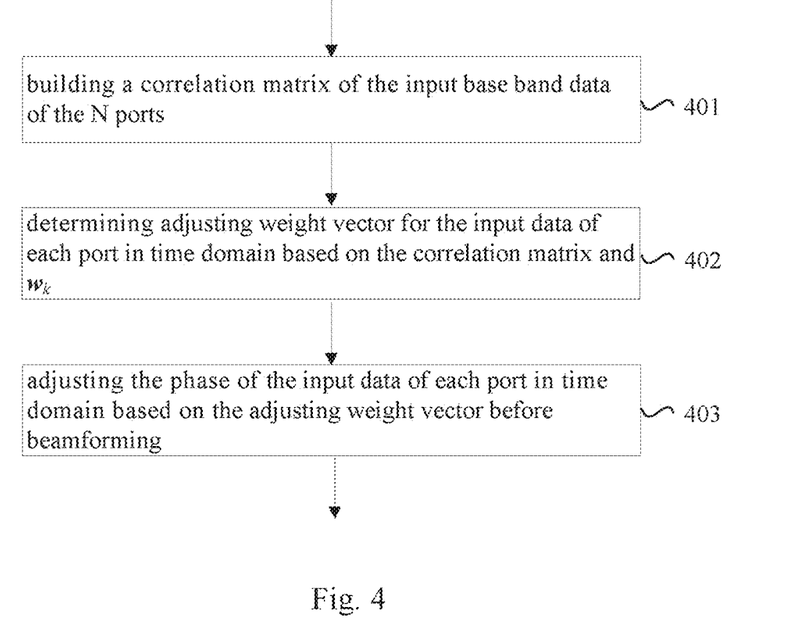
FIG. 4 shows an exemplary flow chart of PAR reduction according to an embodiment of the present invention.

With reference to FIG. 4, in step 401, PAR reduction module builds a correlation matrix of the input base band data of the N ports.

According to an embodiment of the present invention, PAR reduction module builds a correlation matrix of the input data of the N ports. The input correlated data can be the original base band signals before beamforming. The correlation matrix can be built by the following covariance matrix:

$$B=E\{(s-\mu_s)(s-\mu_s)^H\} \quad (1)$$

wherein $\mu_s$ is the average of data in each port.

In step 402, the PAR reduction module determines adjusting weight vector for the input data of each port in time domain based on the correlation matrix and $w_k$.

Specifically, for example, the PAR reduction module searches the adjusting weight vector θ for each port in time domain to minimize the correlation of the original base band data.

According to an embodiment of the present invention, PAR reduction module determines the optimal θ for each input port based on the following:

$$\operatorname*{Min}_{k=1}^{M} (w_k \odot \theta)^H B (w_k \odot \theta) \quad (2)$$

$$\text{s.t. } |\theta| = \operatorname{ones}(1, N)$$

wherein ⊙ means hadamard product.

In step 403, the PAR reduction module adjusts the phase of the input data of each port in time domain based on the adjusting weight vector before beamforming.

According to an embodiment of the present invention, the adjusting weight vector $\theta=[\theta_1\ \theta_2\ \ldots\ \theta_N]$, which has a specific adjusting weight for each of the corresponding port. The PAR reduction module provides with the optimal initial phase of each port based on their adjusting weight respectively, such that all the input ports have a different phase and the correlation of the data of the N ports meets the minimum. Referring back to FIG. 2, $\theta_1$ is used to optimize the initial phase of original data of port 1, $\theta_2$ is used to optimize the initial phase of original data of port 2, and $\theta_N$ is used to optimize the initial phase of original data of port N. That is, the inputting signals to the beamforming module are the convolution of θ and the corresponding port of base band data.

Then the optimized base band signals of N ports can be inputted into beamforming module, and the PAR performance of the output pipes of the beamforming module can be improved.

According to an exemplary embodiment of the present invention, the input ports for base band signals are 4, and the output pipes of beamforming module are 8. Then the correlation matrix of the input data of 4 ports is as follow:

$$B = \begin{bmatrix} 0.58 & 0.25 & 0.25 & 0.25 \\ 0.25 & 0.57 & 0.25 & 0.25 \\ 0.25 & 0.25 & 0.57 & 0.26 \\ 0.25 & 0.25 & 0.26 & 0.57 \end{bmatrix}$$

The optimal $\theta=[1, -0.95=0.3i-0.95=0.3i-1]^H$, and the θ is used to do the time domain phase optimization for all the input data of 4 ports.

Figure 5:
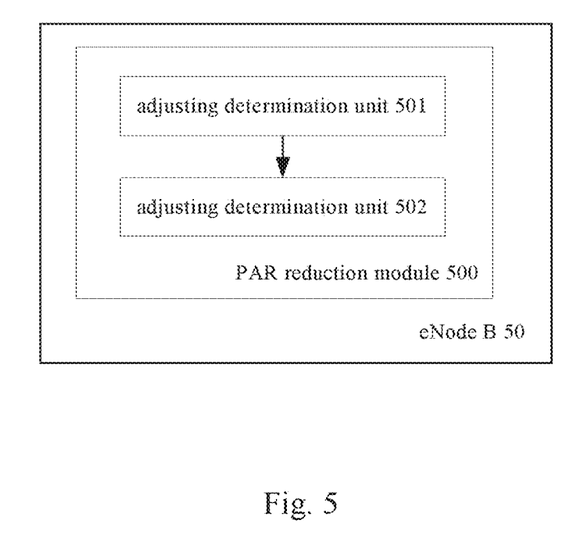
FIG. 5 shows a schematic of function block of the PAR reduction module according to an embodiment of the present invention.

Referring to FIG. 5, the PAR reduction module 500 is equipped in an eNode B 50 and the PAR reduction module further comprises 2 components: an adjusting determination unit 501 and a phase adjusting unit 502.

Adjusting determination unit 501 builds a correlation matrix of the input base band data of the N ports and determines adjusting weight vector for the input data of each port in time domain based on the correlation matrix and $w_k$.

According to an embodiment of the present invention, the adjusting determination unit 501 builds a correlation matrix of the input data of the N ports. The input correlated data can be the original base band signals before beamforming. The correlation matrix can be built by the covariance matrix (1).

Then the adjusting determination unit 501 searches the adjusting weight vector θ for each port in time domain to minimize the correlation of the original base band data.

According to an embodiment of the present invention, the adjusting determination unit 501 determines the optimal θ for each input port based on the calculation (2). The adjusting weight vector $\theta=[\theta_1\ \theta_2\ \ldots\ \theta_N]$, which has a specific adjusting weight for each of the corresponding port.

The adjusting determination unit 501 provides with the optimal initial phase of each port based on their adjusting weight respectively, such that all the input ports have a different phase and the correlation of the data of the N ports meets the minimum.

Phase adjusting unit 502 adjusts the phase of the input data of each port in time domain based on the adjusting weight vector before beamforming.

Referring back to FIG. 2, $\theta_1$ is used to optimize the initial phase of original data of port 1, $\theta_2$ is used to optimize the initial phase of original data of port 2, and $\theta_N$ is used to optimize the initial phase of original data of port N. That is, the inputting signals to the beamforming module are the convolution of θ and the corresponding port of base band data.

Then the optimized base band signals of N ports can be inputted into beamforming module, and the PAR performance of the output pipes of the beamforming module can be improved.

It should be noted that the present invention may be implemented in software or a combination of software and hardware; for example, it may be implemented by an ASIC (Application Specific Integrated Circuit), a general-purpose computer, or any other similar hardware devices.

The software program of the present invention may be executed by a processor to implement the above steps or functions. Likewise, the software program of the present invention (including relevant data structure) may be stored in a computer readable recording medium, for example, a RAM memory, a magnetic or optical driver, or a floppy disk, and other similar devices. Besides, some steps or functions of the present invention may be implemented by hardware, for example, a circuit cooperating with a processor to execute various functions or steps.

Additionally, a portion of the present invention may be applied as a computer program product, for example, a computer program instruction, which, may invoke or provide a method and/or technical solution according to the present invention through operations of the computer when executed by the computer. Further, the program instruction invoking the method of the present invention may be stored in a fixed or mobile recording medium, and/or transmitted through broadcast or data flow in other signal bearer media, and/or stored in a working memory of a computer device which operates based on the program instruction. Here, one embodiment according to the present invention comprises an apparatus comprising a memory for storing a computer program instruction and a processor for executing the program instruction, wherein when the computer program instruction is executed by the processor, the apparatus is triggered to run the methods and/or technical solutions according to a plurality of embodiments of the present invention.

To those skilled in the art, it is apparent that the present invention is not limited to the details of the above exemplary embodiments, and the present invention may be implemented with other embodiments without departing from the spirit or basic features of the present invention. Thus, in any way, the embodiments should be regarded as exemplary, not limitative; the scope of the present invention is limited by the appended claims instead of the above description, and all variations intended to fall into the meaning and scope of equivalent elements of the claims should be covered within the present invention. No reference signs in the claims should be regarded as limiting of the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

The invention claimed is:

1. A method for reducing a Peak to Average power Ration (PAR) of beamforming output signals, wherein input base band data is for N ports and number of beamforming output pipes is M;
   wherein the method comprises the following steps:
   building a correlation matrix of the input base band data of the N ports;
   determining adjusting weight vector for the input data of each port in time domain based on the correlation matrix and $w_k$ being the beamforming weight vector of the total N beams for the k-th output pipe, to minimize the correlation of the input base band data of the N ports, wherein $w_k=\{w_{1,k}w_{2,k}w_{3,k}\cdots w_{N,k}\}$, k=1, 2, . . . , M; and
   adjusting the phase of the input data of each port in time domain based on the adjusting weight vector before beamforming.

2. The method of claim 1, wherein the adjusting makes the phases of the input data of the N ports in time domain different from each other.

3. The method of claim 1, wherein the correlation matrix is built by the following covariance matrix:

$$B=E\{(s-\mu_s)(s-\mu_s)^H\}$$

wherein
data vector s represents for the input base band data of each port; and
$\mu_s$ is the average of data in each port.

4. An apparatus for reducing the Peak to Average power Ration (PAR) of beamforming output signals, wherein input base band data is for N ports and number of beamforming output pipes is M;
   wherein the apparatus is configured to:
   build a correlation matrix of the input base band data of the N ports;
   determine adjusting weight vector for the input data of each port in time domain based on the correlation matrix and $w_k$ being the beamforming weight vector of the total N beams for the k-th output pipe, to minimize the correlation of the input base band data of the N ports, wherein $w_k=\{w_{1,k}w_{2,k}w_{3,k}\cdots w_{N,k}\}$, k=1, 2, . . . , M; and
   adjust the phase of the input data of each port in time domain based on the adjusting weight vector before beamforming.

5. The apparatus of claim 4, wherein the minimize further comprises making the phases of the input data of the N ports in time domain different from each other.

6. The apparatus of claim 4, wherein the correlation matrix is built by the following covariance matrix:

$$B=E\{(s-\mu_s)(s-\mu_s)^H\}$$

wherein
data vector s represents for the input base band data of each port; and
$\mu_s$ is the average of data in each port.

7. An apparatus for reducing the Peak to Average power Ration (PAR) of beamforming output signals, wherein input base band data is for N ports and number of beamforming output pipes is M;
   wherein the apparatus comprises:
   means for building a correlation matrix of the input base band data of the N ports and determining adjusting weight vector for the input data of each port in time domain based on the correlation matrix and $w_k$ being the beamforming weight vector of the total N beams for the k-th output pipe, to minimize the correlation of the input base band data of the N ports, wherein $w_k = \{w_{1,k} w_{2,k} w_{3,k} \ldots w_{N,k}\}$, k=1, 2, ..., M; and means for adjusting the phase of the input data of each port in time domain based on the adjusting weight vector before beamforming.

8. An evolved node B (eNode B) for reducing the Peak to Average power Ration (PAR) of beamforming output signals, wherein input base band data is for N ports and number of beamforming output pipes is M;

wherein an apparatus is configured to:

build a correlation matrix of the input base band data of the N ports;

determine adjusting weight vector for the input data of each port in time domain based on the correlation matrix and $w_k$ being the beamforming weight vector of the total N beams for the k-th output pipe, to minimize the correlation of the input base band data of the N ports, wherein $w_k = \{w_{1,k} w_{2,k} w_{3,k} \ldots w_{N,k}\}$, k=1, 2, ..., M; and adjust the phase of the input data of each port in time domain based on the adjusting weight vector before beamforming.

* * * * *